United States Patent [19]

Gram

[11] Patent Number: 4,939,506
[45] Date of Patent: Jul. 3, 1990

[54] GROUNDING BRUSH MONITOR

[75] Inventor: James A. Gram, Andover, N.Y.

[73] Assignee: Dresser-Rand Company, Corning, N.Y.

[21] Appl. No.: 148,671

[22] Filed: Jan. 26, 1988

[51] Int. Cl.⁵ .............................................. G08B 21/00
[52] U.S. Cl. ..................... 340/649; 340/679; 361/212
[58] Field of Search ............... 340/635, 649, 650, 679, 340/682, 647; 324/509, 510, 545; 361/212, 42

[56] References Cited

U.S. PATENT DOCUMENTS

| | | | |
|---|---|---|---|
| 3,831,160 | 8/1974 | Cronin et al. | 340/649 X |
| 4,502,046 | 2/1985 | Wonn et al. | 340/682 |
| 4,746,911 | 5/1988 | Laine | 340/647 X |

OTHER PUBLICATIONS

General Electric Corporation, The Shaft Voltage Monitor, brochure.

Primary Examiner—Joseph A. Orsino
Assistant Examiner—Jeffery A. Hofsass

[57] ABSTRACT

A ground circuit monitor (10) is disclosed for continuously monitoring the potential of a grounding brush (12) in the grounding circuit (14) used to ground a rotating member (16) within a machine (18). A proximitor (26) generates a radio frequency signal impressed across the secondary of a coupling transformer (30). The primary of the coupling transformer (30) is in series between the grounding brush and ground. In normal operation, the capacitance of the film of lubrication between the rotating member and machine prevents oscillation in the transformer. Failure of the grounding circuit increases oscillation, generating an output from the proximitor to the relay unit (32) to generate an alarm.

6 Claims, 1 Drawing Sheet

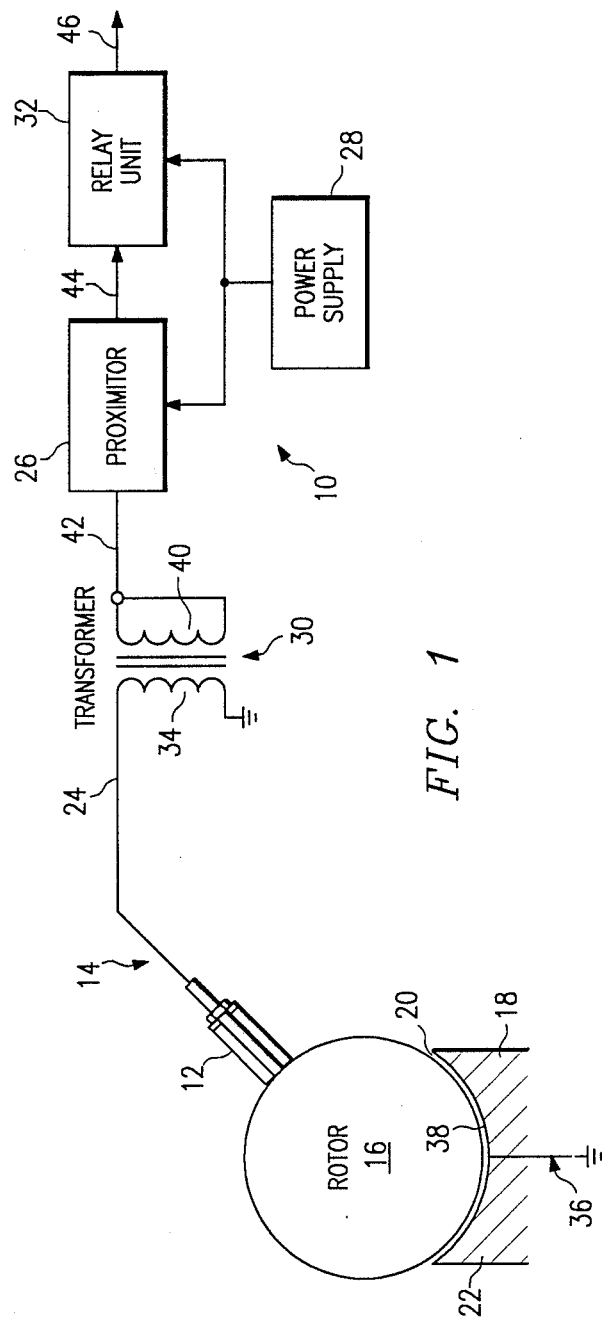

GROUNDING BRUSH MONITOR

TECHNICAL FIELD

This invention is employed in machinery having a rotating component which must be grounded to the machine, and in particular to monitoring the grounding condition.

BACKGROUND OF THE INVENTION

Rotating members are often supported within a machine for rotation on a thin film of lubricating oil between the rotating member and bearings within the machine. One important example is a steam turbine for electrical power generation where the turbine shaft rotates at 3600 r.p.m.

Electrical potentials can develop between a rotating shaft and the stationary portions of the machine through a number of causes. For example, the magnetic fields within the generator operating with the turbine can induce various currents and potentials. Also, static charge can build up on the rotating turbine shaft through interaction with the steam flowing through the turbine. If sufficient potential exists between the rotating shaft and stationary bearings, an electrical discharge or arc can pass between the shaft and bearing, pitting the bearing. If this phenomena is severe, the bearing can fail, with dire consequences. To prevent the buildup of electrical potential between a rotating shaft and machine frame, grounding brushes are urged into electrical contact with the shaft and grounded to the frame. This has proven generally effective. However, the grounding device must be constantly monitored to ensure that it is working properly.

In the past, the General Electric Corporation has developed a shaft voltage monitor which is designed to continuously monitor shaft voltage and shaft current, and to generate an alarm when a grounding failure is detected. While the complete details of the General Electric design are not known, brushes riding on the turbine generator shaft, and connected to ground through a high impedance voltage sensing circuit, provide the mechanism for signaling excessive shaft voltages. A second set of brushes ride on the turbine generator shaft and are connected to a ground through a low impedance, current sensing circuit. This second set of brushes forms the grounding circuit for the shaft and a mechanism for alarm when shaft currents are excessive. However, this system is quite expensive, and a lower cost, effective system for monitoring the grounding circuit of a rotating member is needed.

SUMMARY OF THE INVENTION

In one accordance with one aspect of the present invention, an apparatus is provided for monitoring the grounding circuit of a rotating member rotating within a machine. The rotating member is supported for rotation by the machine through a film of lubrication. A capacitance exists between the rotating member and machine through the film. A grounding brush is used in the grounding circuit in electrical contact with the rotating member. The apparatus includes a proximitor for generating an oscillating signal. A coupling transformer is provided which has a primary and a secondary. The primary is connected in series between the grounding brush and the machine. The secondary is connected to the proximitor and carries the oscillating signal. The proximitor senses the impedance presented by the circuit formed through the grounding brush, primary of the coupling transformer, the film of lubrication and machine. The proximitor generates an output signal correlated to the impedance sensed. Structure is provided for processing the output signal from the proximitor and for generating an alarm when the sensed impedance exceeds a predetermined level, indicating an anomoloy in the grounding circuit.

In accordance with another aspect of the present invention, the proximitor generates a radio frequency oscillating signal. The coupling transformer can be provided with a one to one transformer ratio between the primary and secondary.

BRIEF DESCRIPTION OF THE DRAWINGS

For a more complete understanding of the present invention, and the advantages thereof, reference is now made to the following Description, taken in conjunction with the accompanying Drawing, in which:

FIGS. 1A and 1B are a schematic of a first embodiment of the present invention.

DETAILED DESCRIPTION

With reference now to FIG. 1, there is shown a ground circuit monitor 10 forming a first embodiment of the present invention. The monitor 10 monitors the electrical potential of a grounding brush 12, which is part of the grounding circuit 14 designed to ground the rotating member or rotor 16 to the frame of the machine 18 which supports the member for its rotation.

The rotating member 16, whether it be a turbine shaft in a steam turbine generator, or other rotating member, is typically supported for rotation through a thin film of lubricating oil 20 which is maintained between the outer bearing surface of the rotating member 16 and the stationary bearings 22 mounted on the machine 18. This lubrication film, typically oil, electrically isolates the rotating member from the machine because it is a dielectric, having a substantial capacitance as represented in FIG. 1.

The grounding circuit 14 is intended to ensure that the rotating member is grounded to the machine 18 to resist buildup of an electrical potential between the member and machine which could result in a arc across the lubrication film 20, damaging the bearings. To accomplish this, a grounding brush 12, of conductive material such as carbon, is urged against the rotating member 16 by a spring or the like. The brush is connected to ground through a connector 24. In normal operation, the grounding circuit 14 is adequate to ensure the ground of the rotating member 16. However, as the stationary brush 12 contacts a rotating member 16, the brush wears and will eventually lose contact with the rotating member. Further, the spring utilized to push the brush continuously into contact with the rotating member can fail, and the brush itself can jam. Therefore, a need exists for a monitor to ensure that the grounding circuit is operating properly, and to generate an alarm signal when it is not.

The ground circuit monitor 10 includes a proximitor 26, a power supply 28, a coupling transformer 30 and a relay unit 32. An alarm, not shown, can be associated with the relay unit 32 for activation to generate an aural, visual or other alarm output to an operator that the grounding circuit has failed, or will fail.

The primary 34 of the coupling transformer 30 forms part of conductor 24, so that a complete circuit 36 is defined, which includes the grounding brush 12, conductor 24, primary 34, machine 18, and the capacitance 38 of the lubrication film 20.

The secondary 40 of the coupling transformer 30 is connected to the oscillator signal output 42 of the proximitor 26. The proximitor generates an oscillation signal, preferably at a radio frequency, which is impressed upon the secondary 40 through output 42. The proximitor also includes circuitry for sensing the impedance of the circuit 36 through the coupling transformer 30. Normally, the circuit 36 has a very low electrical impedance presented to the secondary 40, which holds the circuit out of oscillation. However, if an anomaly occurs, such as when the grounding brush loses effective electrical contact with the rotating member, the impedance of the circuit 36 will rise markedly, in turn inducing a voltage rise in the secondary as the circuit begins oscillating, which results in an output from the proximitor along signal output line 44 to the relay unit 32. The signal energizes the relay unit 32 to activate the alarm output along line 46. Remedial action can then be taken to reestablish the grounding circuit 14.

In one device constructed in accordance with the teachings of the present invention, the proximitor was a series 7200 proximitor manufactured by Bently-Nevada, P. 0. Box 157 Minden, Nev. 89423, with its rf probe removed and the rf signal impressed on the transformer. The Bently-Nevada proximitor is a proximity transducer normally used to sense static and dynamic distances between a probe carrying the radio frequency signal, and an object, and is compatible with API 670 type installations. The radio frequency signal is radiated through the probe tip into the observed surfaces. Eddy currents are generated in the observed surface, and the loss of strength in the return signal is detected by the proximitor and conditioned to output the position of the object. The coupling transformer had a one to one ratio with model no. 11Z12, manufactured by Vitec, Inc, 23602 Mercantile Road, Cleveland, Ohio 44122. The relay unit is a Series 250 type 253 PBVU manufactured by Crompton Instruments, Inc., 2763-T Higgins Road, Elk Grove Village, Ill. 60007. The power supply supplied 24 volts DC power. A 12 inch long signal cable connects the rf output of the proximitor to the transformer and is Part No. 83266 RG 130 B/U manufactured by Beldon Wire and Cable, Inc., P.O. Box 148, Essex, Vt. 05452.

It can be understood that the present invention provides a continuous monitor for the integrity of a grounding brush circuit in a very economic manner. The invention provides a much less complicated monitor than commercially available equipment, thereby significantly reducing the cost.

While one embodiment of the present invention has been illustrated in the accompanying Drawing, and described in the foregoing Detailed Description, it will be understood that the invention is not limited to the embodiment disclosed, but is capable of numerous rearrangements, modifications and substitutions of parts and elements without departing from the spirit of the invention.

I claim:

1. An apparatus for monitoring the grounding circuit for a rotating member rotating within a machine, the rotating member supported for rotation by the machine through a film of lubrication, a capacitance of predetermined value existing between the rotating member and machine through the lubrication film, a grounding brush utilized in the grounding circuit, comprising:
   a proximitor for generating an oscillating signal;
   a coupling transformer having a primary and a secondary, the primary connected in series between the grounding brush and the machine, the secondary connected to the proximitor and carrying the oscillating signal;
   the proximitor sensing the impedance presented by the circuit formed by the grounding brush, primary, lubrication film and machine, and generating an output signal correlating to the impedance sensed; and
   means for processing the output signal from the proximitor and for generating an alarm when the sensed impedance exceeds a predetermined impedance, indicating an anomaly in the grounding circuit.

2. The apparatus of claim 1 wherein the proximitor oscillating signal is a radio frequency.

3. The apparatus of claim 1 wherein the coupling transformer has a ratio of one to one between the primary and the secondary.

4. The apparatus of claim 1 wherein the rotating member is a turbine shaft.

5. An apparatus for monitoring the grounding circuit of a rotating member rotating on a machine, the rotating member supported for rotation by the machine through lubrication, a capacitance of predetermined value existing between the rotating member and machine through the lubrication, a grounding brush used in the grounding circuit, comprising:
   a proximitor for generating a radio frequency signal;
   a coupling transformer having a primary and a secondary, the primary connected in series between the grounding brush and machine, the radio frequency signal of the proximitor being impressed upon the secondary;
   the proximitor sensing the impedance presented by the circuit formed of the grounding brush, primary, lubrication, machine and rotating member, and generating an output signal correlated to the sensed impedance; and
   a relay unit receiving the output signal of the proximitor and energizing an alarm when the output signal from the proximitor exceeds a predetermined level indicating an anomaly in the grounding circuit.

6. The apparatus of claim 5 wherein the transformer has a one to one ratio between the primary and the secondary.

* * * * *